United States Patent
Higaki et al.

(10) Patent No.: US 8,262,540 B2
(45) Date of Patent: Sep. 11, 2012

(54) SHIFT CONTROL DEVICE FOR WORK VEHICLE

(75) Inventors: Masami Higaki, Ryugasaki (JP); Tetsuji Tanaka, Abiko (JP); Hideo Nakayama, Jyoso (JP); Eiichi Sakai, Ryugasaki (JP); Hidenobu Tsukada, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1269 days.

(21) Appl. No.: 11/996,472

(22) PCT Filed: Jul. 20, 2006

(86) PCT No.: PCT/JP2006/314401
§ 371 (c)(1),
(2), (4) Date: Jan. 22, 2008

(87) PCT Pub. No.: WO2007/010991
PCT Pub. Date: Jan. 25, 2007

(65) Prior Publication Data
US 2009/0093340 A1    Apr. 9, 2009

(30) Foreign Application Priority Data
Jul. 22, 2005   (JP) ................ 2005-213460

(51) Int. Cl.
*B60W 10/04* (2006.01)
(52) U.S. Cl. ........................ 477/109; 477/111
(58) Field of Classification Search .......... None
See application file for complete search history.

(56) References Cited

U.S. PATENT DOCUMENTS

| 5,876,301 | A | 3/1999 | Tabata et al. |
| 6,749,534 | B2 | 6/2004 | Watanabe et al. |
| 2003/0022758 | A1 | 1/2003 | Watanabe et al. |
| 2005/0021208 | A1 | 1/2005 | Nagai et al. |
| 2005/0227810 | A1* | 10/2005 | Nakagawa et al. ........... 477/172 |

FOREIGN PATENT DOCUMENTS

| JP | 4-123939 A | 4/1992 |
| JP | 9-256883 A | 9/1997 |
| JP | 2003-41971 A | 2/2003 |
| JP | 2005-42742 A | 2/2005 |

OTHER PUBLICATIONS

International Search Report dated Sep. 12, 2006 (Two (2) Pages).

* cited by examiner

*Primary Examiner* — David D Le
*Assistant Examiner* — Erin D Bishop
(74) *Attorney, Agent, or Firm* — Crowell & Moring LLP (57) ABSTRACT

A shift control device for a work vehicle that has a stepped automatic transmission includes: a control device that controls an engine rotation rate at the work vehicle and the stepped automatic transmission; a forward/reverse switchover member that outputs a forward/reverse switchover command for the work vehicle; and an operation quantity detection device that detects an accelerator pedal operation quantity in the work vehicle is operated. As the forward/reverse switchover command is output via the forward/reverse switchover member, the control device executes forward/reverse switchover control for the stepped automatic transmission and also controls the engine rotation rate so as to decrease the engine rotation rate gradually to a target lower limit value selected to ensure that a reverse rotation of a turbine runner at a torque converter in the work vehicle does not occur.

18 Claims, 6 Drawing Sheets

SHIFT CONTROL DEVICE FOR WORK VEHICLE

TECHNICAL FIELD

The present invention relates to a shift control device for a work vehicle having installed there in a stepped automatic transmission.

BACKGROUND ART

A stepped automatic transmission is sometimes installed in a work vehicle such as a wheel loader. The shift control devices for such work vehicles known in the related art include those that apply a brake with a braking force corresponding to the extent to which the accelerator pedal has been operated in response to a forward/reverse switchover operation and actually switches gears between forward and reverse in the automatic transmission as the vehicle speed becomes reduced to a predetermined speed by closing at throttle valve (see patent reference literature 1). This type of shift control device adjusts the degree of openness of the throttle valve when the vehicle speed becomes further reduced to substantially zero so that the degree of openness corresponds to the extent to which the accelerator pedal has been operated.

Patent reference literature 1: Japanese Laid Open Patent Publication No. H4-123939

DISCLOSURE OF THE INVENTION

Problems to be Solved by the Invention

As the forward/reverse switchover lever is switched from forward to reverse and the accelerator pedal is released in order to switch from a forward traveling state to a reverse traveling state via a shift control device in the related art, the engine rotation rate decreases rapidly. This gives rise to a concern that the sudden decrease in engine rotation rate will cause a sudden change in the rotation rate and a reverse rotation of the turbine runner at the torque converter, resulting in a shift shock in the vehicle.

Means for Solving the Problems

A shift control device for a work vehicle that has a stepped automatic transmission according to a first aspect of the present invention includes: a control device that controls an engine rotation rate at the work vehicle and the stepped automatic transmission; a forward/reverse switchover member that outputs a forward/reverse switchover command for the work vehicle; and an operation quantity detection device that detects an accelerator pedal operation quantity in the work vehicle is operated, wherein: as the forward/reverse switchover command is output via the forward/reverse switchover member, the control device executes forward/reverse switchover control for the stepped automatic transmission and also controls the engine rotation rate so as to decrease the engine rotation rate gradually to a target lower limit value selected to ensure that a reverse rotation of a turbine runner at a torque converter in the work vehicle does not occur.

Once the engine rotation rate is decreased to the target lower limit value, the control device may control the engine rotation rate in correspondence to the accelerator pedal operation quantity detected by the operation quantity detection device. It is preferable that if the engine rotation rate corresponding to the accelerator pedal operation quantity at a time of the forward/reverse switchover command output is greater than a predetermined rotation rate set in advance to be greater than the target lower limit value, the control device executes control on the engine rotation rate such that after the engine rotation rate is immediately decreased to the predetermined rotation rate, the engine rotation rate is made to gradually decrease to the target lower limit value. A value equivalent to a lower-limit engine rotation rate at which an engine brake applied to the work vehicle works effectively may be set as the predetermined rotation rate. It is preferable that if the engine rotation rate corresponding to the accelerator pedal operation quantity at a time of the forward/reverse switchover command output is smaller than the target lower limit value, the control device executes control so as to first increase the engine rotation rate to the target lower limit value and then hold the engine rotation rate at the target lower limit value.

The control device may set a decrease rate with which the engine rotation rate is to decrease such that following an output of the forward/reverse switchover command, adjustment of a control hydraulic pressure applied to a hydraulic clutch to be switched to is completed immediately after the vehicle speed of the work vehicle is lowered to substantially zero. It is preferable that the target lower limit value and the predetermined rotation rate are set to values that allow a forward clutch and a reverse clutch to be switched without subjecting the work vehicle to a shift shock when the engine rotation rate is equal to or greater than the target lower limit value and is equal to or smaller than the predetermined rotation rate.

A work vehicle according to a second aspect of the present invention includes a shift control device according to the first aspect.

In a shift control method of a work vehicle that has a stepped automatic transmission according to a third aspect of the present invention, forward/reverse switchover control for the stepped automatic transmission is executed in response to a forward/reverse switchover command output via a forward/reverse switchover member that outputs the forward/reverse switchover command for the work vehicle, and the engine rotation rate is controlled so as to gradually decrease the engine rotation rate to a target lower limit value assuming a value selected so as to prevent reverse rotation of a turbine runner at a torque converter in the work vehicle.

Advantageous Effect of the Invention

According to the present invention, smooth forward/reverse switchover is enabled without subjecting a work vehicle to shift shock.

BEST MODE FOR CARRYING OUT THE INVENTION

A preferred embodiment of a shift control device for a work vehicle according to the present invention is now explained in reference to drawings.

Figure 1:
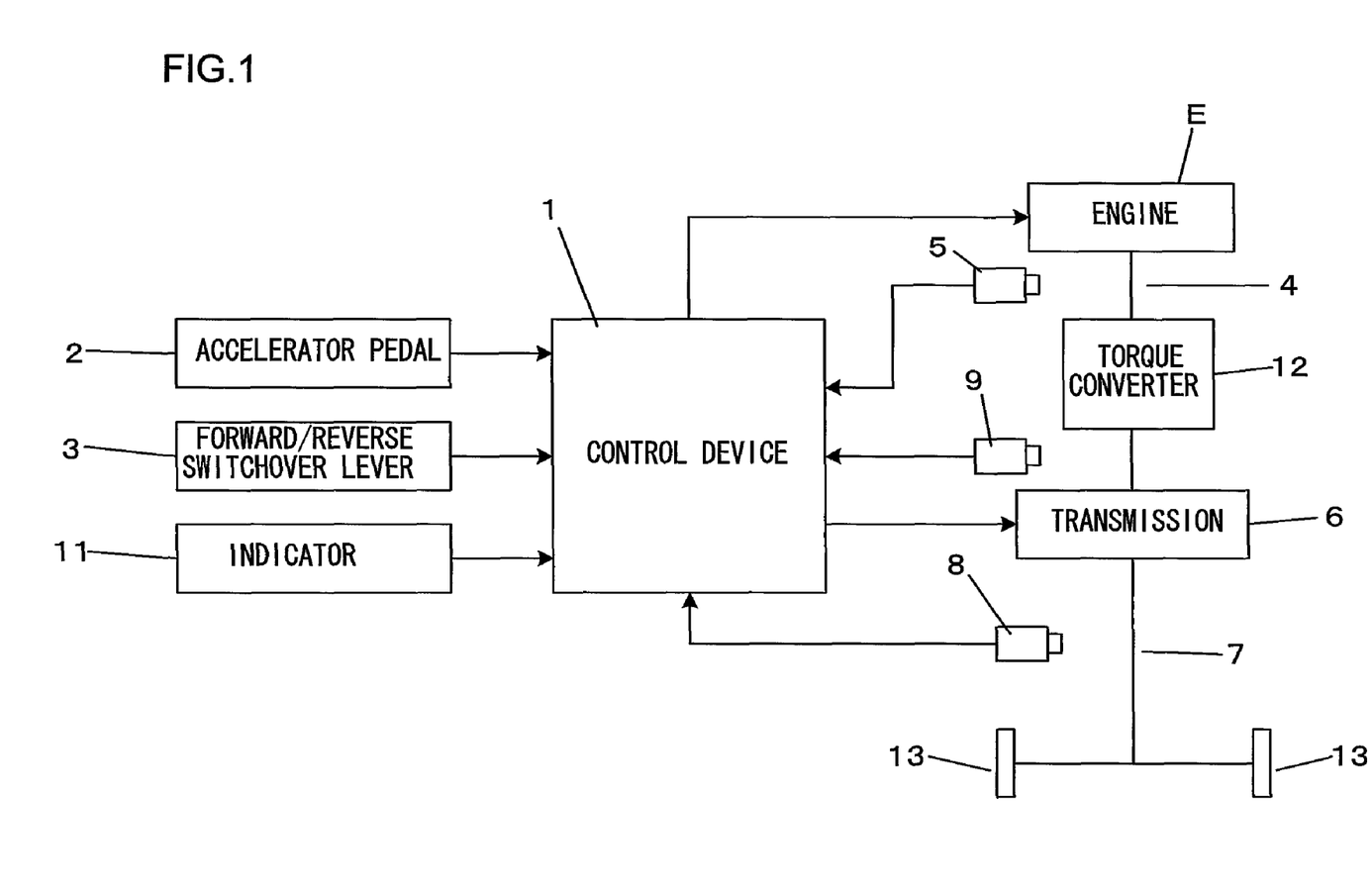
FIG. 1 is a system diagram of a shift control device for a work vehicle achieved in an embodiment of the present invention.

FIG. 1 is a system diagram of the shift control device for a work vehicle achieved in an embodiment of the present invention. The shift control device includes a control device 1, an accelerator pedal 2, a forward/reverse switchover lever 3, an engine rotation sensor 5, a transmission 6, a vehicle speed sensor 8, a transmission input rotation sensor 9, a torque converter 12 and the like.

The control device 1 obtains an accelerator pedal operation quantity detection signal indicating the extent to which the accelerator pedal is operated from the accelerator pedal 2 and a command signal related to forward/reverse switchover from the forward/reverse switchover lever 3. In addition, the control device 1 obtains an engine rotation rate detection signal from the engine rotation sensor 5 that detects the rotation rate of an output shaft 4 of an engine E, a vehicle speed detection signal from the vehicle speed sensor 8 that detects the rotation rate of an output shaft 7 of the transmission 6 and a detection signal indicating the input rotation rate at the transmission 6 from the transmission input rotation sensor 9.

Based upon these detection signals, the control device 1 controls the engine E and the transmission 6 and provides a signal related to a rotation rate and the vehicle speed to an indicator 11. Reference numeral 12 in FIG. 1 indicates the torque converter, whereas reference numeral 13 indicates a drive wheel of the work vehicle. It is to be noted that the control device 1 is also able to control the engine 1 via an engine controller (not shown). The engine controller installed as standard equipment associated with the engine E, is a controller that issues a fuel injection command to the engine E in correspondence to the accelerator pedal operation quantity.

It is to be noted that the transmission 6 includes a forward/reverse clutch and a speed stage clutch, each constituted with a hydraulic wet multiple-disk clutch. The forward/reverse clutch and the speed stage clutch are each a positive type hydraulic clutch, with the hydraulic pressure applied thereto increased to shift from a clutch released state to a clutch engaged state and the hydraulic pressure applied thereto decreased to shift from the clutch engaged state to the clutch released state. The control device 1 controls a plurality of solenoid valves (not shown) that individually control the supply of hydraulic operating fluid to these clutches. The solenoid valves are each engaged in opening/closing operation in response to a drive signal issued by the control device 1. As the solenoid valve opens, the hydraulic pressure to the clutch increases, whereas as it closes, the hydraulic pressure to the clutch decreases.

Figure 2:
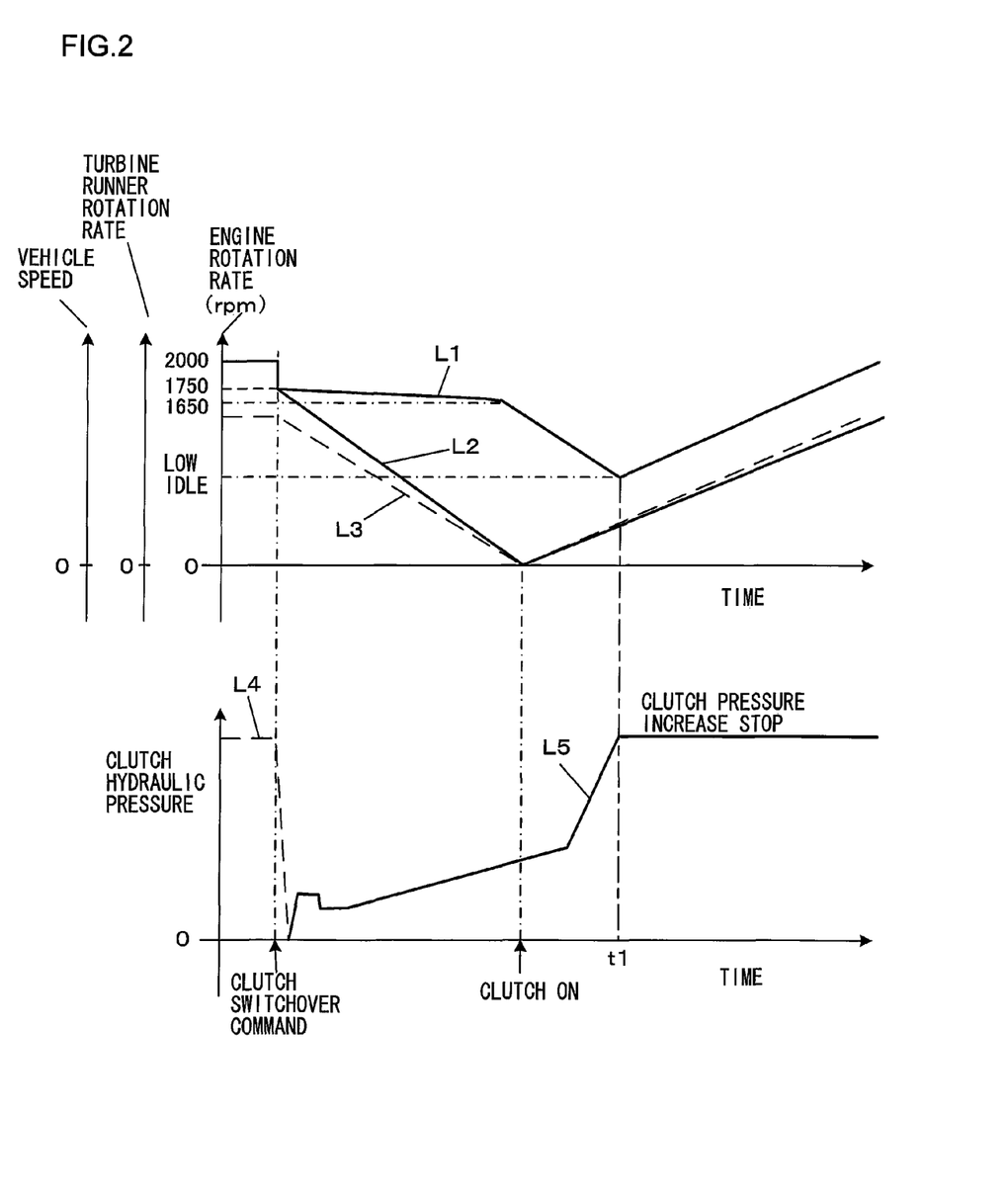
FIG. 2 is a timing chart in reference to which the shift control device for a work vehicle achieved in the embodiment is explained.

FIG. 2 presents a timing chart of the control executed by the control device 1 when the operator of the work vehicle switches the forward/reverse switchover lever 3 to the reverse position from the forward position and releases the accelerator pedal 2. On the upper side in FIG. 2, a polygonal line L1, indicating the engine rotation rate (rpm) detected via the engine rotation sensor 5, a polygonal line L2 indicating the turbine runner rotation rate at the torque converter 12 detected via the transmission input rotation sensor 9 and the vehicle speed L3 detected via the vehicle speed sensor 8 are charted. On the lower side in FIG. 2, a waveform L4 of the hydraulic pressure used to control the forward clutch and a waveform L5 of the hydraulic pressure used to control the reverse clutch are charted.

As the operator switches the forward/reverse switchover lever 3 to the reverse position and releases the accelerator pedal 2 while the work vehicle is traveling forward, a forward/reverse switchover command and a signal indicating the accelerator pedal operation quantity are input to the control device 1. The control device 1 then decreases the forward clutch control hydraulic pressure and increases the reverse clutch control hydraulic pressure. The forward clutch becomes released as a result of the decrease in the control hydraulic pressure, whereas the increase in the control hydraulic pressure applied to the reverse clutch causes it to engage (clutch ON) and the pressure applied to the reverse clutch stops increasing at a time point t1.

In addition, the control device 1 provides the engine E with a command for controlling the engine rotation rate so as to first lower it to a predetermined rotation rate A and then gradually decrease it to a target lower limit value T by, for instance, gradually reducing the fuel injection quantity, instead of a command for adjusting the engine rotation rate immediately to a low idle rotation rate, i.e., instead of a command for reducing the fuel injection quantity to a low idle-equivalent quantity.

It is to be noted that a switch with which a low idle rotation rate L or a high idle rotation rate H can be selected is normally installed in a work vehicle such as a wheel loader. The low idle rotation rate L is a setting at which the work vehicle such as a wheel loader is able to travel or engage in work operation and corresponds to a higher speed than the regular allowable minimum engine rotation rate. The high idle rotation rate H is set to the maximum rotation rate of the engine E so as to enable the work vehicle to operate under high load conditions during the actual work operation.

The target lower limit value T of the engine rotation rate mentioned earlier, representing an engine rotation rate at which reverse rotation of the turbine runner does not occur following a forward/reverse switchover, is set in advance (recorded in advance) in a control program for the control device 1. In addition, the predetermined rotation rate A is set to the lowest limit rotation rate at which the engine brake applied to the work vehicle still works effectively. The target lower limit value T and the predetermined rotation rate A are determined by the performance levels of the engine E and the torque converter 12 and the inertial force imparted by the work vehicle, i.e., the weight of the work vehicle. In the embodiment, assuming that the rotation rate at which the reverse rotation of the turbine runner at the torque converter 12 occurs is 1650 rpm, the target lower limit value T is set to 1650 rpm and the predetermined rotation rate A is set to 1750 rpm, as shown in FIG. 2. In addition, the values are selected for the target lower limit value T and the predetermined rotation rate A by ensuring that when the engine rotation rate is equal to or greater than the target lower limit value T and is equal to or less than the predetermined rotation rate A, the forward/reverse clutch switchover can be carried out smoothly without causing a shift shock to the work vehicle.

Upon receiving a forward/reverse switchover command from the forward/reverse switchover lever 3, the control device 1 controls the engine E so as to gradually reduce the engine rotation rate with a specific slope set in advance in the control program for the control device 1, until the engine rotation rate reaches the target lower limit value T having been set, irrespective of the command related to the accelerator pedal operation quantity. As a forward-to-reverse switchover command is output, the rotation rate of the turbine runner, too, first decreases by a certain extent and then starts to decrease steadily and gradually during this process, as indicated by the polygonal line L2 in FIG. 2. Thus, the force transmitted from the torque converter 12 is gradually decreased so as to prevent reverse rotation of the turbine runner at the torque converter 12 due to a connection of the reverse clutch occurring while the vehicle is still in the forward traveling state and to ultimately prevent shift shock. It is to be noted that the term "slope" used in relation to the engine rotation rate refers to the engine rotation rate decrease rate indicated by the rate of change in the engine rotation rate over time i.e., (extent of engine rotation rate change)/(elapsing time).

The rate at which the engine rotation rate is gradually decreased, i.e., the slope, determined based upon the relationship between the clutch control hydraulic pressure time chart and the turbine runner rotation rate, which decreases as the engine rotation rate decreases, is set to an optimal value so as to prevent reverse rotation of the turbine runner and, at the same time, enable quick switch-back traveling.

As shown in FIG. 2, when the engine rotation rate detected at the time of the forward/reverse switchover command output is 2000 rpm and the target lower limit value is equal to or greater than 1650 rpm, the control device 1 first immediately decreases the rotation rate of the engine E to the predetermined rotation rate A (1750 rpm) regardless of the accelerator pedal operation quantity and then gradually decreases the rotation rate to the target lower limit value T (1650 rpm). Once the engine rotation rate decreases to the target lower limit value T, the control device controls the engine rotation rate so that it conforms to the accelerator pedal operation quantity. In the example presented in FIG. 2, the engine rotation rate is quickly lowered to the low idle rotation rate L.

While the engine rotation rate is within the range between the predetermined rotation rate A (1750 rpm) and the target lower limit value T (1650 rpm), it is controlled so as to gradually decrease with a specific slope. As a result, the force transmitted via the torque converter 12, also decreases gradually and does not dissipate abruptly. Since the reverse clutch becomes gradually connected while the work vehicle is in the forward traveling state, the vehicle speed decreases quickly. Once the forward clutch is released, the reverse clutch is connected while the engine rotation rate is within the range between the predetermined rotation rate A and the target lower limit value T, minimizing the extent of shift shock and enabling a smooth forward/reverse switchover.

After the engine rotation rate decreases to the target lower limit value T (1650 rpm), the engine rotation rate is controlled in conformance to the accelerator pedal operation quantity so that the operator does not experience any handling discomfort.

As described above, the specific slope with which the engine rotation rate is made to decrease is set in advance in the control program for the control device 1 and the control device 1 executes this program. The specific slope is obtained by fixing the length of time over which the engine rotation rate is to decrease to the target lower limit value T to a desired length of time. The desired length of time for achieving the specific slope can be set so that the vehicle speed is lowered to zero immediately (1~2 sec) before the rise in the hydraulic pressure applied to the clutch ends following the switchover by ensuring that the desired length of time expires before the time point t1 at which the increase in the hydraulic pressure for the clutch to be switched to is completed following the clutch switchover operation.

In the example presented in FIG. 2, the operator, having performed the switchover operation from forward to reverse and having temporarily released the accelerator pedal 2, steps on the accelerator pedal 2 again at the time point t1.

It is to be noted that if the engine rotation rate detected at the time of the forward/reverse switchover command output is less than the target lower limit value T (1650 rpm), the control device 1 controls the engine rotation rate so as to increase the engine rotation rate to the target lower limit value T and hold it at the target lower limit value T. As a result, the operator is able to perform the forward/reverse switchover operation with similar ease to that he would experience if the engine rotation rate was equal to or greater than the target lower limit value T, while preventing any shift shock attributable to reverse rotation of the turbine runner.

In addition, by controlling the engine rotation rate so as to finish the increase in the hydraulic pressure applied to the clutch following the forward/reverse switchover immediately after detecting via the vehicle speed sensor 8 that the vehicle speed has decreased substantially to zero and allowing the work vehicle to switch back, as shown in FIG. 2, the forward/reverse switchover is completed promptly.

Figure 6:
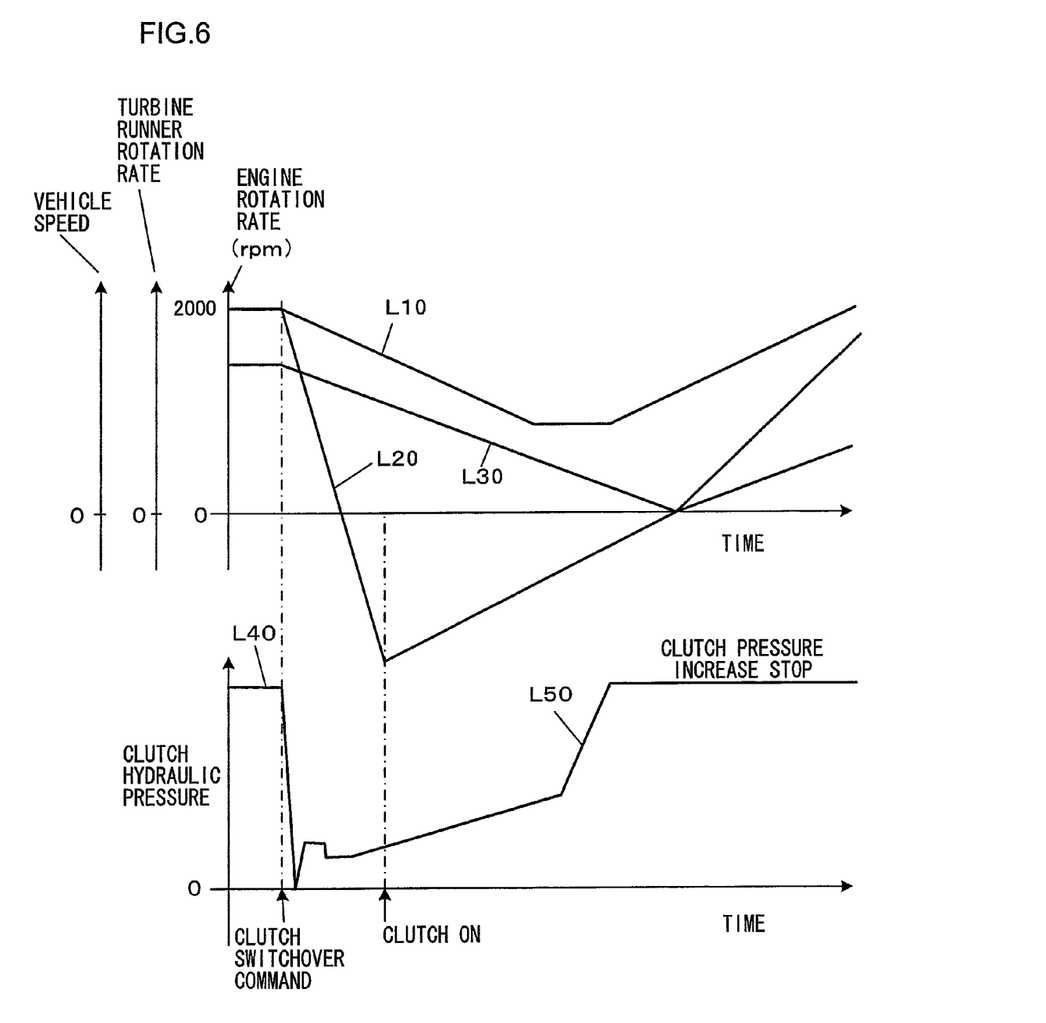
FIG. 6 is a timing chart related to forward-to-reverse switchover, provided for purposes of comparison.

FIG. 6 presents a timing chart related to control executed to immediately decrease the engine rotation rate as the accelerator pedal is released during a forward-to-reverse switchover operation provided for purposes of comparison. On the upper side in FIG. 6, a polygonal line L10 indicating the engine rotation rate, a polygonal line L20 indicating the turbine runner rotation rate at the torque converter and the vehicle speed L30 are charted. On the lower side in FIG. 6, a waveform L40 of the hydraulic pressure used to control the forward clutch and a waveform L50 of the hydraulic pressure used to control the reverse clutch are charted.

As the operator of the work vehicle currently in the forward traveling state operates the forward/reverse switchover lever to switch from the forward traveling state to the reverse traveling state and releases the accelerator panel, the engine rotation rate decreases to the low idle rate L promptly, as indicated by the polygonal line L10. The sudden decrease in the engine rotation rate causes the rotation rate of the turbine runner at the torque converter to decrease suddenly as well, as indicated by the polygonal line L20. As a result, the force transmitted via the torque converter decreases suddenly, resulting in a rapid decrease in the torque applied to the clutch. As the torque applied to the reverse clutch is lowered, the reverse clutch becomes connected at a relatively low control hydraulic pressure. Consequently, the reverse clutch becomes connected before the speed of the work vehicle is lowered to zero, i.e., while the work vehicle is still in the forward traveling state. If the reverse clutch becomes connected in the forward traveling state, the forward advancing wheels cause the turbine runner at the torque converter to rotate in a direction opposite from the pump impeller rotating direction.

If the rotation rate of the turbine runner at the torque converter changes drastically to result in reverse rotation immediately after the forward/reverse switchover command is output by operating the forward/reverse switchover lever, a shift shock occurs at the work vehicle. Frequent occurrence of such shift shock is not desirable, as it will increase operator fatigue. It is to be noted that while the turbine runner starts rotating along the reverse direction slightly before the reverse clutch becomes connected (clutch ON) in FIG. 6, this reverse rotation occurs in the pre-connection state due to the small force transmitted via the torque converter.

In addition, when the engine rotation rate is low, the force transmitted from the torque converter is smaller and thus, a greater length of time must elapse before the vehicle speed is lowered to substantially zero following the output of the forward/reverse switchover command. This means that the work vehicle coasts along the pre-switchover direction and the state in which the work vehicle advancing direction remains unchanged is sustained over a significant length of time.

In comparison, the engine rotation rate is first lowered to the predetermined rotation rate A following the output of the forward/reverse switchover command and then the engine rotation rate is gradually decreased, as shown in FIG. 2 in the embodiment. Consequently, reverse rotation of the turbine runner, which would otherwise occur as the post-switchover clutch becomes connected before the work vehicle advancing direction is switched, is prevented and ultimately, the occurrence of shift shock is prevented.

Moreover, the control device achieved in the embodiment controls the vehicle speed so that it decreases to zero promptly after the forward/reverse switchover command is output, as shown in FIG. 2. As a result, the distance over which the work vehicle is allowed to coast along the pre-switchover advancing direction can be reduced.

Figure 3:
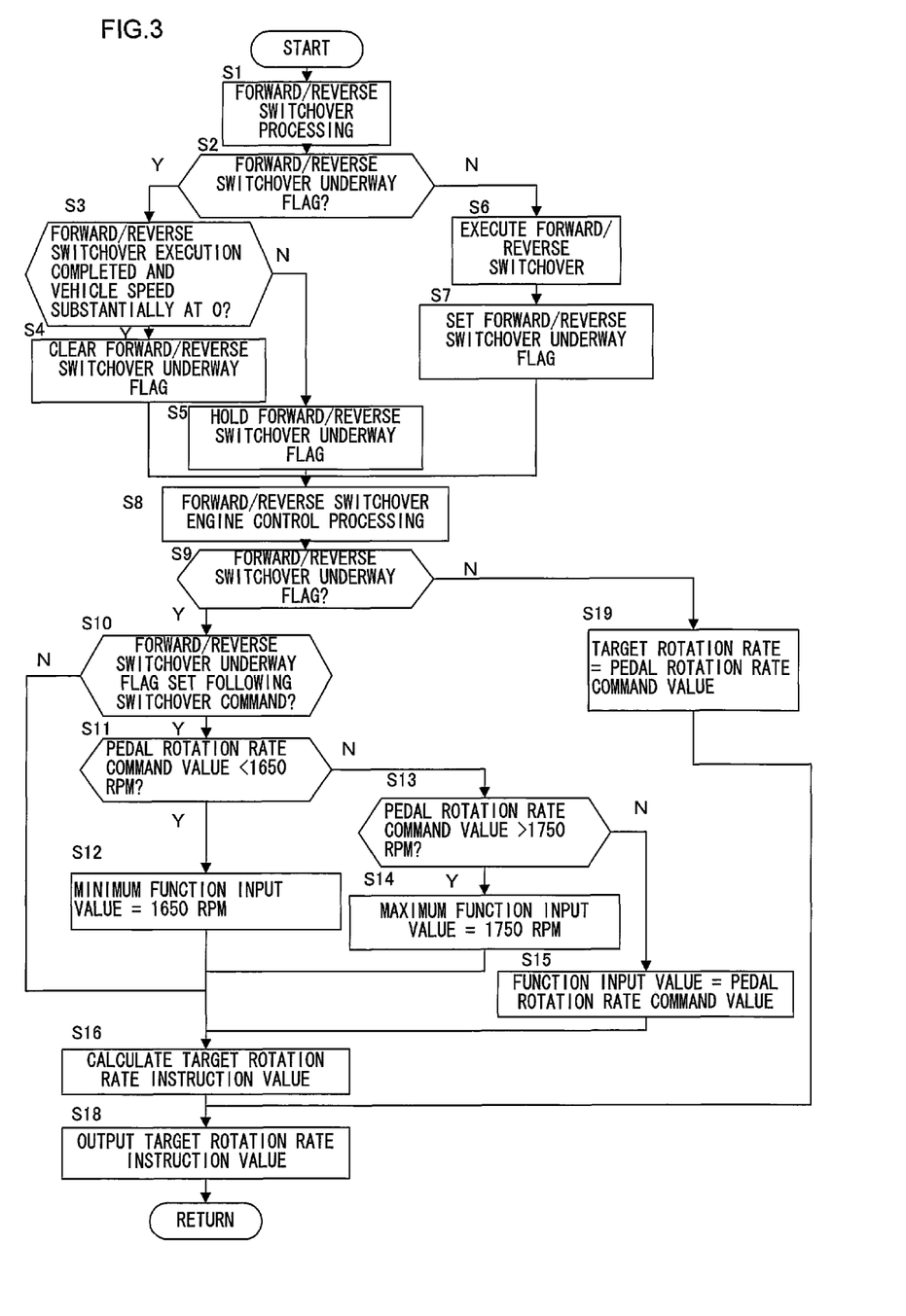
FIG. 3 presents a flowchart of the processing procedures of the forward/reverse switchover processing and the engine control processing executed by the shift control device for a work vehicle in the embodiment.

The operation executed by the control device in the embodiment is now explained in detail in reference to FIG. 3. FIG. 3 presents a flowchart of the forward/reverse switchover processing and the engine control processing during the forward/reverse switchover, executed by the control device 1 in conformance to the control program in the embodiment. The processing starts in response to an output of a forward/reverse switchover instruction issued by operating the forward/reverse switchover lever 3. The following explanation is given by assuming that the forward/reverse switchover lever 3 is switched to the reverse position while the work vehicle is traveling in the forward traveling state.

Once the forward/reverse switchover processing starts (S1), a decision is made in step S2 as to whether or not the forward/reverse switchover for the work vehicle is underway. If a flag to be detailed later is set to indicate that the forward/reverse switchover is underway, it is decided that the forward/reverse switchover is underway and the operation proceeds to step S3. If, on the other hand, the forward/reverse switchover underway flag is in a cleared state, it is decided that the forward/reverse switchover is not underway and the operation proceeds to step S6.

In step S6, the solenoid valves in the control hydraulic pressure circuit through which the control hydraulic pressures are applied to the forward/reverse clutches are switched so as to actually execute the forward/reverse switchover by individually controlling the control hydraulic pressures to the forward/reverse clutches. Then, in step S7, the flag is set to indicate "forward/reverse switchover underway".

In step S3, decisions are made as to whether or not the solenoid valve switchover has been completed and thus, the forward/reverse switchover has been completed and also whether or not the vehicle speed of the work vehicle has decreased substantially to zero. More specifically, if the forward clutch has become disengaged with the reverse clutch entering the connected (clutch ON) state and the vehicle speed detected via the vehicle speed sensor 8 is substantially equal to zero, the operation proceeds to step S4. In step S4, the clutch forward/reverse switchover is judged to have been completed and, accordingly, the "forward/reverse switchover underway" flag is cleared. If, on the other hand, a negative decision is made in step S3, the operation proceeds to step S5 to sustain the "forward/reverse switchover underway" flag.

Subsequently, the operation proceeds to step S8 to shift into the engine control processing executed during the forward/reverse switchover. In step S9, a decision is made as to whether or not the flag is set to indicate "forward/reverse switchover underway". If the flag is set to indicate "forward/reverse switchover underway", the operation proceeds to step S10 to make a decision as to whether or not the "forward/reverse switchover underway" setting has been selected only after the output of the forward/reverse switchover command. For instance, if the "forward/reverse switchover underway" flag was cleared during the previous cycle and the flag has been set to indicate "forward/reverse switchover underway" in the current cycle, an affirmative decision is made in step S10. Once an affirmative decision is made in step S10, the operation proceeds to step S11. If, on the other hand, a negative decision is made, the operation proceeds to step S16.

In step S11, a decision is made as to whether or not an accelerator pedal rotation rate command value corresponding to the extent to which the accelerator pedal 2 has been operated is smaller than the target lower limit value T (1650 rpm). If the accelerator pedal rotation rate command value is smaller than the target lower limit value T, the operation proceeds to step S12 to set 1650 rpm for the input value (minimum value) in a function used in the calculation of the target engine rotation rate. If, on the other hand, the accelerator pedal rotation rate command value is equal to or greater than the target lower limit value T, the operation proceeds to step S13 to make a decision as to whether or not the accelerator pedal rotation rate command value is greater than the predetermined rotation rate A (1750 rpm). If the accelerator pedal rotation rate command value is greater than the predetermined rotation rate A, the operation proceeds to step S14 to set 1750 rpm for the input value (maximum value) in the function used in the calculation of the target engine rotation rate. If a negative decision is made in step S13, the operation proceeds to step S15 to directly set the accelerator pedal rotation rate command value as the input value in the function.

In the following step S16, a target engine rotation rate instruction value is calculated by using an integral low pass filter so that the engine rotation rate decreases gently with the specific slope explained earlier. Thus, if the accelerator pedal rotation rate command value is greater than the predetermined rotation rate A, the target rotation rate instruction value gradually decreases from the predetermined rotation rate A to the target lower limit value T, whereas if the accelerator pedal rotation rate command value is equal to or greater than the target lower limit value T and equal to or less than the predetermined rotation rate A, the target rotation rate instruction value gradually decreases from the accelerator pedal rotation rate command value indicated when an affirmative decision is made in step S10 to the target lower limit value T. If the accelerator pedal rotation rate command value is smaller than the target lower limit value T, the target rotation rate instruction value is fixed to the target lower limit value T.

If it is decided in step S9 that the "forward/reverse switchover underway" flag has been cleared, the operation proceeds to step S17 to set the rotation rate command value corresponding to the extent to which the accelerator pedal 2 is operated directly as the target rotation rate instruction value. In step S18, a command for controlling the engine rotation rate based upon the target rotation rate instruction value having been set in step S16 or step S17 is issued to the engine E. The current processing then ends.

It is to be noted that while the explanation is given above on the control executed when the work vehicle in the forward traveling state is switched to the reverse traveling state, similar control is executed when the work vehicle in the reverse traveling state is switched to the forward traveling state.

Figure 4:
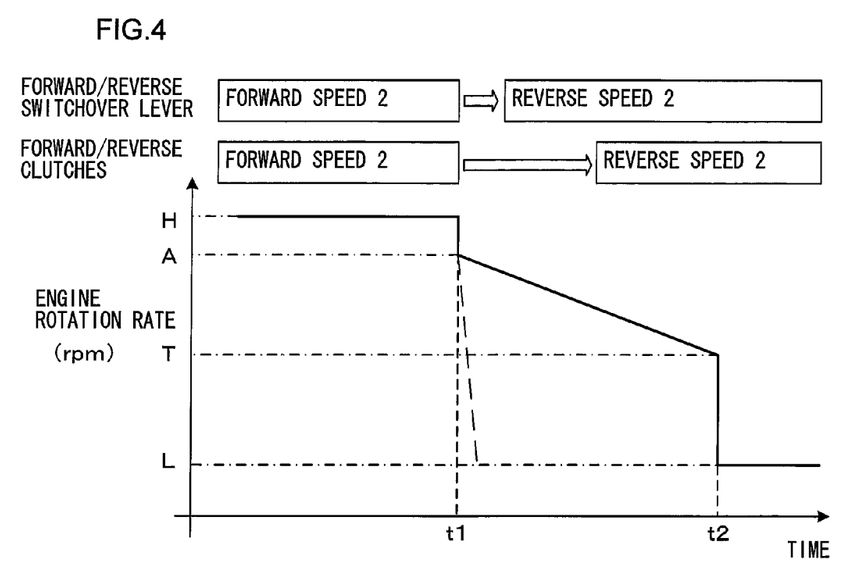
FIG. 4 is a timing chart in reference to which the operations of the shift control device for a work vehicle achieved in the embodiment are explained.
Figure 5:
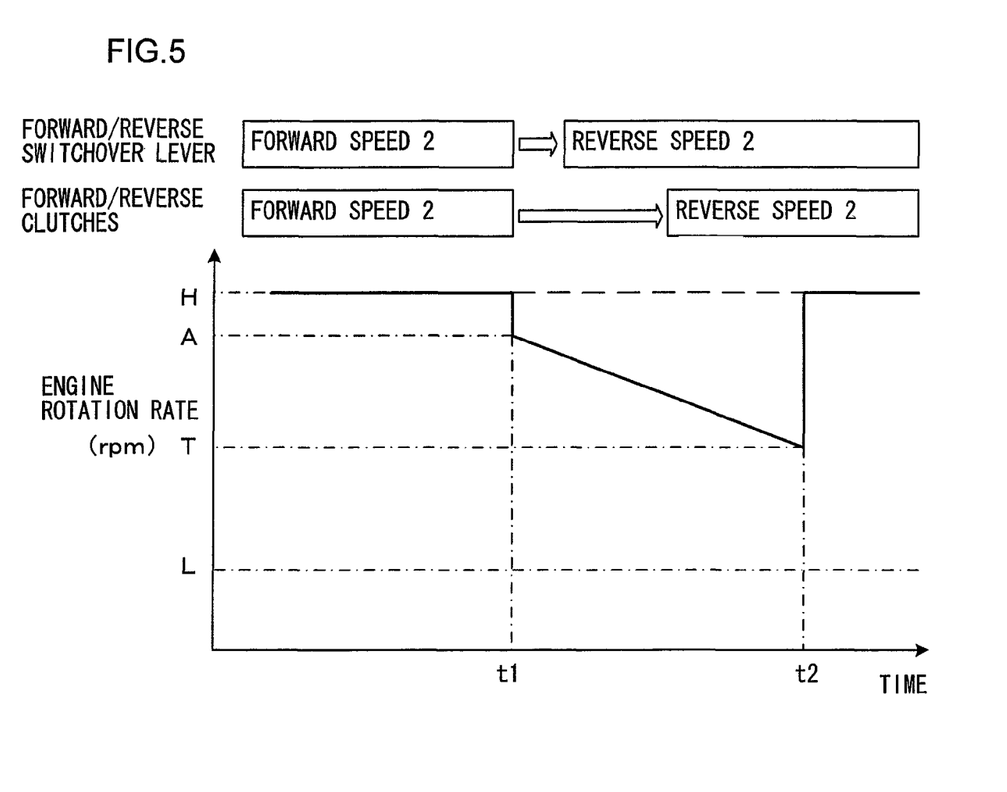
FIG. 5 is another timing chart in reference to which the operations of the shift control device for a work vehicle achieved in the embodiment are explained.

The operations of the control device for the work vehicle achieved in the embodiment are now explained in reference to FIGS. 4 and 5. FIG. 4 is a timing chart of the engine rotation rate detected as the operator releases the accelerator pedal 2 immediately after a forward/reverse switchover command is output through the forward/reverse switchover lever 3 and the engine rotation rate shifts from the high idle rotation rate H to the low idle rotation rate L. The timing chart represents an example in which a shift from forward speed 2 to reverse speed 2 is effected by operating the forward/reverses witch over lever 3. It is assumed that the speed stage has been set to speed 2 at the transmission 6 through an operation of a shift change lever (not shown). In FIG. 4, the actual engine rotation rate detected by the engine rotation sensor 5 is indicated by the solid line and the engine rotation rate instruction value corresponding to the extent to which the accelerator pedal 2 is operated is indicated by the broken line.

As shown in FIG. 4, the operator of the work vehicle in the forward traveling state at the high idle rotation rate H switches the forward/reverse switchover lever 3 from the forward speed 2 position to the reverse speed 2 position at a time point t1 and immediately after the switchover, the operator releases the accelerator pedal 2. In response to the command from the accelerator pedal 2, the control device 1 transmits a fuel injection quantity restrict command to the engine E so as to first decrease the engine rotation rate from the high idle rotation rate H to the predetermined rotation rate A. In this case, the command from the accelerator pedal 2 is a command to decrease the engine rotation rate to the low idle rotation rate L in response to the accelerator pedal 2 being released.

Once the engine rotation rate decreases to the predetermined rotation rate A, the engine rotation rate is controlled so as to gradually decrease from the predetermined rotation rate A to the target lower limit value T, regardless of the engine rotation rate command value from the accelerator pedal 2, which is indicated by the broken line. During this phase, the control hydraulic pressure applied to the forward clutch decreases and the control hydraulic pressure applied to the reverse clutch increases with the hydraulic pressure to the reverse clutch stopping increasing by a time point t2 at which the engine rotation rate is lowered to the target lower limit value T. As a result, the switchover from the forward clutch to the reverse clutch can be executed smoothly.

After the time point t2 at which the engine rotation rate decreases to the target lower limit value T, the engine rotation rate is lowered to the low idle rotation rate L in conformance to the rotation rate command value from the accelerator pedal 2. Namely, the restriction having been imposed with regard to the rate at which the engine rotation rate decreases until it reaches the target lower limit value T is cleared. Subsequently, the engine rotation rate decreases immediately from the target lower limit value T to the low idle rotation rate L.

It is to be noted that while the engine rotation rate drops vertically, i.e., drops instantaneously, relative to the time axis within the range between the high idle rotation rate H and the predetermined rotation rate A and the range between the target lower limit value T and the low idle rotation rate L in the timing chart presented in FIG. 4, the engine rotation rate will actually drop with a slight tilt attributable to factors such as a control delay. In other words, a very short time period elapses before the engine rotation rate actually changes. Namely, in the example presented in FIG. 4, control is executed so as to gradually decrease the engine rotation rate to the target lower limit value T in response to the forward/reverse switchover command during a specific length of time elapsing after the short time period, regardless of the accelerator pedal operation quantity.

FIG. 5 presents a timing chart of the engine rotation rate detected while the operator holds down the accelerator pedal 2 immediately after a forward/reverse switchover command is output from the forward/reverse switchover lever 3. The timing chart represents an example in which a shift from a forward speed 2 to a reverse speed 2 is effected by operating the forward/reverse switchover lever 3. In FIG. 5, the actual engine rotation rate detected by the engine rotation sensor 5 is indicated by the solid line and the engine rotation rate instruction value corresponding to the extent to which the accelerator pedal 2 is operated is indicated by the broken line.

As shown in FIG. 5, the operator of the work vehicle in the forward traveling state at the high idle rotation rate H switches the forward/reverse switchover lever 3 from the forward speed 2 position to the reverse speed 2 position at a time point t1. The control device 1 transmits a fuel injection quantity restrict command to the engine E so as to first decrease the engine rotation rate from the high idle rotation rate H to the predetermined rotation rate A. Once the engine rotation rate decreases to the predetermined rotation rate A, the engine rotation rate is controlled so as to gradually decrease from the predetermined rotation rate A to the target lower limit value T, regardless of the engine rotation rate command value from the accelerator pedal 2, which is indicated by the broken line. During this phase, the control hydraulic pressure applied to the forward clutch decreases and the control hydraulic pressure applied to the reverse clutch increases with the hydraulic pressure to the reverse clutch stopping increasing by the time point t2 at which the engine rotation rate is lowered to the target lower limit value T. As a result, the switchover from the forward clutch to the reverse clutch can be executed smoothly. After the time point t2 at which the engine rotation rate decreases to the target lower limit value T, the engine rotation rate is raised to the high idle rotation rate H in conformance to the rotation rate command value from the accelerator pedal 2.

As shown in FIGS. 4 and 5, in response to an output of the forward/reverse switchover command, the control device 1 quickly decreases the engine rotation rate to the predetermined rotation rate A, which defines the lower limit at which the engine brake can be effectively applied. More specifically, the control device restricts the quantity of fuel injected to the engine E. As a result, better fuel efficiency is achieved.

It is to be noted that while the forward/reverse clutches in the embodiment described above are positive hydraulic clutches, the present invention is not limited to this example and it may be adopted in conjunction with negative hydraulic clutches. In addition, while the work vehicle described above is a wheel loader, the present invention may be adopted in an automatic transmission installed in a work vehicle other than a wheel loader.

The target lower limit value T for the engine rotation rate and the predetermined rotation rate A, based upon which control is executed following a forward/reverse switchover command output, are respectively set to 1650 rpm and 1750 rpm in the embodiment described above. However, values other than these may be selected for the target lower limit value T and the predetermined rotation rate A and optimal values should be selected based upon the specifications of the work vehicle and the like so as to ensure that the forward/reverse clutch switchover can be executed smoothly.

An explanation is given above in reference to the embodiment on an example in which the control device 1 controls both the rotation rate of the engine E and the transmission 6. However, the present invention is not limited to this example and there may be separate control devices, independent of each other, engaged in control of the rotation rate of the engine E and control of the transmission 6, respectively.

While the invention has been particularly shown and described with respect to a preferred embodiment and variations thereof by referring to the attached drawings, the present invention is not limited to these examples and it will be understood by those skilled in the art that various changes in form and detail may be made therein without departing from the scope and teaching of the invention.

The disclosure of the following priority application is herein incorporated by reference:
Japanese Patent Application No. 2005-213460 filed Jul. 22, 2005

The invention claimed is:

1. A shift control device for a work vehicle that comprises a stepped automatic transmission, the stepped automatic transmission being configured to transmit an engine output via a torque converter and including a plurality of hydraulic clutches, the shift control device comprising:
a control device that controls an engine rotation rate at the work vehicle and controls the stepped automatic transmission;
a forward/reverse switchover member that outputs a forward/reverse switchover command for the work vehicle; and
an operation quantity detection device that detects an accelerator pedal operation quantity in the work vehicle, wherein:
as the forward/reverse switchover command is output via the forward/reverse switchover member while the work vehicle is traveling, the control device executes forward/reverse switchover control for the stepped automatic transmission and also controls the engine rotation rate so as to decrease the engine rotation rate gradually at a decrease rate to a target lower limit value selected to ensure that a reverse rotation of a turbine runner at the torque converter in the work vehicle does not occur, with the decrease rate being determined based upon a relationship between a hydraulic pressure time chart for controlling the hydraulic clutches and a turbine runner rotation rate which decreases as the engine rotation rate decreases.

2. The shift control device for a work vehicle according to claim 1, wherein:
once the engine rotation rate is decreased to the target lower limit value, the control device controls the engine rotation rate in correspondence to the accelerator pedal operation quantity detected by the operation quantity detection device.

3. The shift control device for a work vehicle according to claim 2, wherein:
if an engine rotation rate corresponding to an accelerator pedal operation quantity at a time of the forward/reverse switchover command output is greater than a predetermined rotation rate set in advance to be greater than the target lower limit value, the control device executes control on the engine rotation rate such that after the engine rotation rate is immediately decreased to the predetermined rotation rate, the engine rotation rate is made to gradually decrease to the target lower limit value.

4. The shift control device for a work vehicle according to claim 2, wherein:
if an engine rotation rate corresponding to an accelerator pedal operation quantity at a time of the forward/reverse switchover command output is smaller than the target lower limit value, the control device executes control so as to first increase the engine rotation rate to the target lower limit value and then hold the engine rotation rate at the target lower limit value.

5. The shift control device for a work vehicle according to claim 2, wherein:
the control device sets the decrease rate with which the engine rotation rate is to decrease such that following the output of the forward/reverse switchover command, adjustment of a control hydraulic pressure applied to a one of the hydraulic clutches to be switched to is completed immediately after a vehicle speed of the work vehicle is lowered to substantially zero.

6. The shift control device for a work vehicle according to claim 1, wherein:
if an engine rotation rate corresponding to an accelerator pedal operation quantity at a time of the forward/reverse switchover command output is greater than a predetermined rotation rate set in advance to be greater than the target lower limit value, the control device executes control on the engine rotation rate such that after the engine rotation rate is immediately decreased to the predetermined rotation rate, the engine rotation rate is made to gradually decrease to the target lower limit value.

7. The shift control device for a work vehicle according to claim 6, wherein:
a value equivalent to a lower-limit engine rotation rate at which an engine brake applied to the work vehicle works effectively is set as the predetermined rotation rate.

8. The shift control device for a work vehicle according to claim 7, wherein:
if an engine rotation rate corresponding to an accelerator pedal operation quantity at a time of the forward/reverse switchover command output is smaller than the target lower limit value, the control device executes control so as to first increase the engine rotation rate to the target lower limit value and then hold the engine rotation rate at the target lower limit value.

9. The shift control device for a work vehicle according to claim 7, wherein:
the control device sets the decrease rate with which the engine rotation rate is to decrease such that following the output of the forward/reverse switchover command, adjustment of a control hydraulic pressure applied to a one of the hydraulics clutches to be switched to is completed immediately after a vehicle speed of the work vehicle is lowered to substantially zero.

10. The shift control device for a work vehicle according to claim 6, wherein:
the target lower limit value and the predetermined rotation rate are set to values that allow a forward clutch of the plurality of hydraulic clutches and a reverse clutch of the plurality of hydraulic clutches to be switched without subjecting the work vehicle to a shift shock when the engine rotation rate is equal to or greater than the target lower limit value and is equal to or smaller than the predetermined rotation rate.

11. The shift control device for a work vehicle according to claim 6, wherein:
if an engine rotation rate corresponding to an accelerator pedal operation quantity at a time of the forward/reverse switchover command output is smaller than the target lower limit value, the control device executes control so as to first increase the engine rotation rate to the target lower limit value and then hold the engine rotation rate at the target lower limit value.

12. The shift control device for a work vehicle according to claim 6, wherein:
the control device sets the decrease rate with which the engine rotation rate is to decrease such that following the output of the forward/reverse switchover command, adjustment of a control hydraulic pressure applied to a one of the hydraulic to be switched to is completed immediately after a vehicle speed of the work vehicle is lowered to substantially zero.

13. The shift control device for a work vehicle according to claim 1, wherein:
if an engine rotation rate corresponding to an accelerator pedal operation quantity at a time of the forward/reverse switchover command output is smaller than the target lower limit value, the control device executes control so as to first increase the engine rotation rate to the target lower limit value and then hold the engine rotation rate at the target lower limit value.

14. The shift control device for a work vehicle according to claim 13, wherein:
the control device sets the decrease rate with which the engine rotation rate is to decrease such that following the output of the forward/reverse switchover command, adjustment of a control hydraulic pressure applied to a one of the hydraulics clutches to be switched to is completed immediately after a vehicle speed of the work vehicle is lowered to substantially zero.

15. The shift control device for a work vehicle according to claim 1, wherein:
the control device sets the decrease rate with which the engine rotation rate is to decrease such that following the output of the forward/reverse switchover command, adjustment of a control hydraulic pressure applied to a one of the hydraulic clutches to be switched to is completed immediately after a vehicle speed of the work vehicle is lowered to substantially zero.

16. A work vehicle comprising the shift control device according to claim 1.

17. The shift control device for a work vehicle according to claim 1, wherein:
as the forward/reverse switchover command is output, the control device decreases the engine rotation rate gradually to the target lower limit value regardless of an accelerator pedal operation quantity detected by the operation quantity detection device.

18. A shift control method for a work vehicle that comprises a stepped automatic transmission, the stepped automatic transmission being configured to transmit an engine output via a torque converter and including a plurality of hydraulic clutches, the shift control method comprising the acts of:
executing forward/reverse switchover control for the stepped automatic transmission in response to a forward/reverse switchover command output while the work vehicle is traveling via a forward/reverse switchover member that outputs the forward/reverse switchover command for the work vehicle, and
controlling an engine rotation rate so as to gradually decrease the engine rotation rate at a decrease rate to a target lower limit value selected so as to prevent reverse rotation of a turbine runner at a torque converter in the work vehicle,
wherein the decrease rate is determined based upon a relationship between a hydraulic pressure time chart for controlling the hydraulic clutches and a turbine runner rotation rate which decreases as the engine rotation rate decreases.

* * * * *